INVENTORS
LASZLO RABIAN
GEORG GRENDELMEIER

Sept. 23, 1969  L. RABIAN ET AL  3,469,101
DEVICE FOR THE COMPENSATION OF VARIABLE INTERFERENCE EFFECTS
ON A RADIATION-ELECTRICAL MEASURING OR CONTROL SYSTEM
Filed Sept. 30, 1966  2 Sheets-Sheet 2

INVENTORS
LASZLO RABIAN
GEORG GRENDELMEIER

BY *Wenderoth, Lind & Ponack*

ATTORNEYS

United States Patent Office 3,469,101
Patented Sept. 23, 1969

3,469,101
DEVICE FOR THE COMPENSATION OF VARIABLE INTERFERENCE EFFECTS ON A RADIATION-ELECTRICAL MEASURING OR CONTROL SYSTEM
Laszlo Rabian, Zurich, and Georg Grendelmeier, Dietikon, Switzerland, assignors to Oerlikon-Buhrle Holding Ltd., Zurich, Switzerland
Filed Sept. 30, 1966, Ser. No. 583,311
Claims priority, application Switzerland, Oct. 2, 1965, 13,621/65
Int. Cl. G01j 1/32
U.S. Cl. 250—205
3 Claims

ABSTRACT OF THE DISCLOSURE

A single source of light is made to illuminate two independent sets of photocells. The output of one set of photocells is fed back to the source to control its intensity whereby the illumination of the photocells is held constant despite changes in the optical system.

---

The present invention relates to a device designed to compensate variable interference effects on a radiation-electrical measuring or control system which, by means of control signals, controls the useful radiation issuing from a radiation source and impinging on a useful-radiation receiver, the arrangement being such that the intensity of a subsidiary radiation exciting an additional radiation receiver is kept at a constant value by means of the said radiation receiver and an amplifier of characteristis connected to the latter.

In a known arrangement of this type, the interference effect is due to the variable daylight. This interference is removed by forming a constant basic level of subsidiary radiation composed of the sum of the variable daylight radiation and a second additionally generated radiation. An electric incandescent bulb is controlled through the amplifier by a photocell arranged outside the measuring or control circuit in such a manner that the radiation intensity of the bulb is high in weak daylight and low in strong daylight, accordingly. However, this arrangement has the drawback that the subsidiary radiation does not pass through the measuring or control circuit, so that when the source of useful radiation ages and its radiation intensity for a given voltage is thus reduced or when the radiation path of the measuring or control circuit becomes contaminated, as in the case of mirrors, graduated grids, lenses etc., the decline in the radiation intensity is not compensated in the receiver of the useful radiation.

Especially when the device is used on machine-tools, it is subject to such contamination by dust, oil, condensed vapor, etc.

It is an object of the present invention to remove this drawback. According to the invention, the subsidiary radiation issuing from the radiation source passes through a section of the measuring or control system that has no control signals, and the feed to the radiation source is regulated by the amplifier.

With the above and other objects in view which will become apparent from the detailed description below, a preferred embodiment of the invention is shown in the drawings in which.

Figure 1:
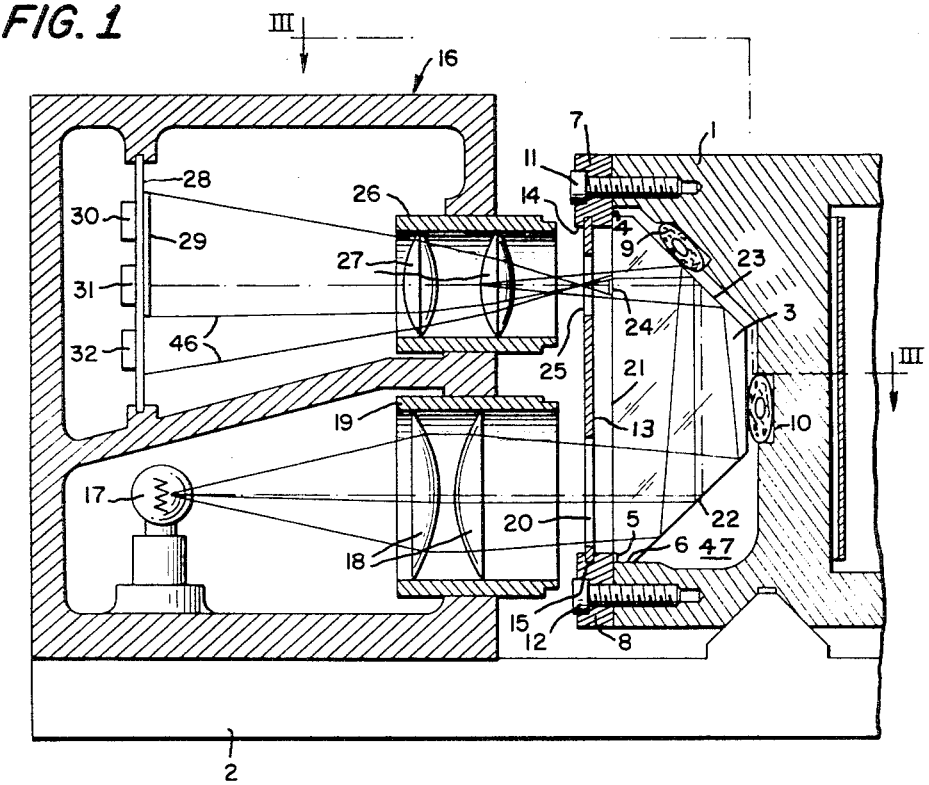
FIGURE 1 shows th compensation device in vertical section as arranged on a photo-electric measuring system of a machine-tool.

As shown in FIG. 1, a table 1 of a machine-tool is slidable on a base plate 2 in a direction perpendicular to the drawing plane. A glass prism 3 is arranged in a recess 47 in the table 1 by means of strips 7 and 8 secured to the table by bolts 11 and 12 and by means of the rubber cords 9 and 10, in such a way that the said prism rests against the faces 4 and 5 of the strip and the surface 6 of the table. The said prism is provided on its face 21 with a scale 24, whose division on the face perpendicular to the drawing plane is 0.1 mm. Two side-faces of the prism are indicated at 22 and 23.

Arranged opposite the prism 3 and rigidly connected with the baseplate 2 is a measuring microscope, indicated generally by 16. The said microscope is provided with an incandescent bulb 17 which forms a radiation source and whose light is deflected by a condenser 18 fitted inside a tube 19 so as to form a beam passing at right angles through the face 21 of the prism 3.

Arranged opposite to the scale 24 and fitted inside a further tube 26 is a lens assembly 27 which projects the graduated grid 24 enlarged as a real image 29 on a ground-glass 28 of the measuring microscope 16. Attached to the reverse side of the ground-glass 28 are the photocells 30, 31 and 32, which have a similar temperature behavior.

Figure 2:
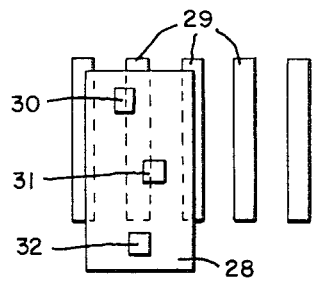
FIGURE 2 shows the arrangement of photocells with respect to a graduated portion of a scale.

In FIG. 2, the photocells 30 and 31 forming the useful-radiation receiver are mutually displaced in the direction of the graduation of the image 29, so that when the table 1 is moved on the baseplate they are atlernately shaded and lighted. Connected to those photocells is a meter, not shown, such as is described in the Swiss patent application No. 12,292/65. The photocell 32 forming the additional radiation receiver is exposed to the radiation 46, which also passes through the lens assembly 27 and which passes outside the scale 24, through the face 21 of the prism 3.

Figure 3:
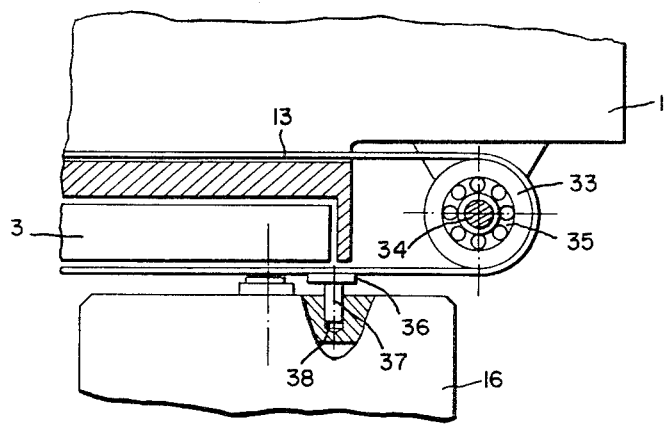
FIGURE 3 shows a section along line III—III in FIGURE 1 partly cut away.

As shown in FIGS. 1 and 3, arranged in the grooves 14 and 15 of the strips 7 and 8 is an endless plastic band 13 which protects the prism 3 from coarse contamination and from the radiation from extraneous sources. The band 13 runs round two rollers 33 mounted in ball bearings 35 arranged on two axles 34 secured to the table 1. A plate 36 attached to the band 13 is provided with a pin 37 which extends into a bore 38 of the measuring microscope 16 and connects the band with the microscope.

Opposite the condenser 18 and the lens assembly 27, the band 13 has apertures 20 and 25, permitting light to pass through the band.

Figure 4:
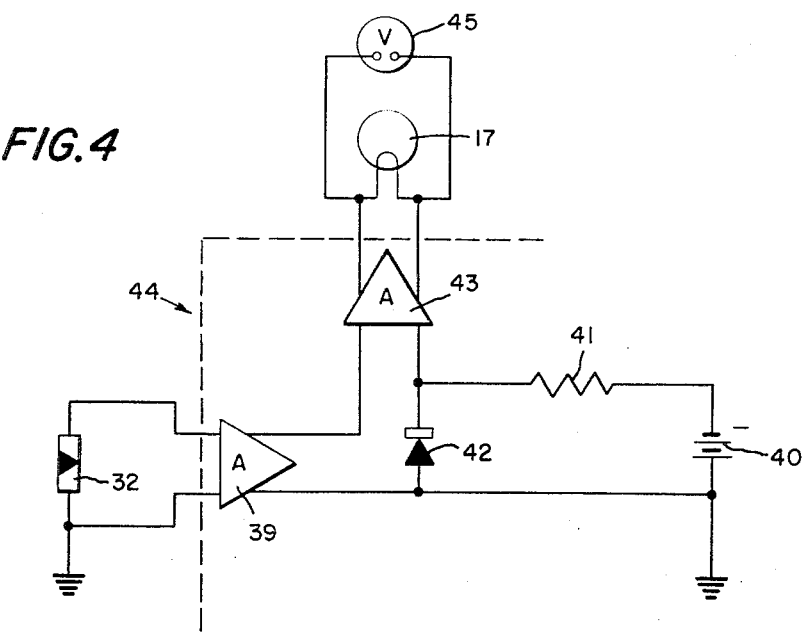
FIGURE 4 shows an electric circuit diagram.

In FIG. 4, the photocell 32, whose photo-electric voltage is proportional to the luminous intensity of the subsidiary radiation on the ground-glass 28, feeds an amplifier 39 of an amplifier assembly indicated generally at 44. A stabilized reference voltage is developed by an earthed battery 40, to which a Zener diode 42 is connected across a series resistor 41. The difference between the photo-electric voltage amplified in the amplifier 39 and the reference voltage at the Zener diode 42 feeds a further amplifier 43, whose out-put circuit includes a light-source 17 and a voltmeter 45. When the voltage difference at the input of the amplifier is zero, the incandescent bulb 17 receives no voltage. This condition is not consistent with the whole system, however, since a difference of voltage of the value zero at the input of amplifier 43 corresponds to a high voltage at the photocell 32. This again presupposes a strong incandescent of bulb 17. The amplifier is automatically set to a stable operation, in which the difference of voltage existing at the input of amplifier 43 lies between the reference voltage at the Zener diode 42 and zero voltage.

The operation is as follows:

The light emitted by the light-source 17 passes through the condenser 18 and the aperture 20 of the band 13 on to the face 22 of the prism 3, which reflects the light on to the face 23 of the said prism. Reflected by the face 23, the light passes through the scale 24, the aperture 25 of the band 13, and the lens assembly 27 on to the ground-glass 28, on which the enlarged image 29 of the scale 24 is projected.

Now, if, as a result of aging of the light-source 17 or contamination of condenser 18, prism 3 or lens assembly 27, the luminous intensity impinging on the ground-glass 28 diminishes, the voltage developed by the photocell 32 will also be reduced. The reduction in the photoelectric voltage results after amplification in the amplifier 39, in a voltage difference with respect to the stabilized reference voltage.

This voltage difference, amplified in amplifier 43, corrects the voltage of the light-source 17 until the original luminous intensity is restored on the ground-glass 28.

The voltmeter 45 permits the state of the optical system to be checked at any time. If the indication of the voltmeter exceeds a pre-set value, either the bulb 17 must be checked or then the condenser 18, the lens assembly 27 and the prism 3 must be cleaned.

Owing to the similar temperature behavior of the photocells 30, 31 and 32, in the arrangement described the photo-electric voltage of the cells 30 and 31 is automatically kept constant as a function of the temperature, thus ensuing high repetition accuracy.

It is though that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

We claim:
1. In a photoelectric gaging system: optical means comprising an electrical source of light, said means being adapted to emit a pencil of light; a transparent element having a front face traversed by said pencil, means for moving said element relative to said source of light to displace said front face in a direction transverse to said pencil, said front face having two adjacent regions extending in said direction, a first one of said region having a grating to provide for a transparency of said front face along said first region varying periodically in said direction, the transparency of said front face along said second region being substantially constant; a photoelectric sensing unit disposed to receive light from said source of light traversing said first region and operable by said grating; a photoelectric control element disposed to receive light from said source of light traversing said second region; and an electrical feed-back circuit connected between said control element and said source of light, said circuit comprising an amplifier controlled by said control element.

2. In a system according to claim 1, wherein a difference between a constant voltage and the variable voltage of said control element is amplified by a further amplifier.

3. In a system according to claim 2 wherein said constant voltage is taken from a Zener diode fed by an additional source of voltage.

References Cited
UNITED STATES PATENTS

| | | | |
|---|---|---|---|
| 2,356,195 | 8/1944 | Balsley | 315—151 |
| 2,411,440 | 11/1946 | Lepage | 315—151 |
| 2,938,123 | 5/1960 | Constable | 250—83.6 |
| 2,995,978 | 8/1961 | Glandon et al. | 250—205 |
| 3,215,843 | 11/1965 | Neil | 250—205 |

JAMES W. LAWRENCE, Primary Examiner

E. R. LAROCHE, Assistant Examiner

U.S. Cl. X.R.

250—220; 315—151, 237